United States Patent Office 3,226,319
Patented Dec. 28, 1965

3,226,319
PROCESS OF CONSOLIDATING A VOLUMINOUS, LOW SOLIDS CONTENT SLUDGE
Josef Schick, Gewannweg 29, Obersdorf uber Siegen, Germany
No Drawing. Filed Mar. 25, 1963, Ser. No. 268,513
16 Claims. (Cl. 210—52)

The invention realtes to a process for consolidating low-solids-content liquid sludge, for instance, a precipitated sewage deposit, by an addition of agglomerants. The process is of use with sludges and deposits of industrial and municipal origin whether of organic or inorganic nature.

It is an object of the invention so to dehydrate the organic and/or inorganic sludges evolved in sewage purification that a compact, easily handled, water-repellant and water-insoluble sediment is produced so that filtration of the sewage sludge becomes unnecessary.

The purification of industrial and municipal sewage has progressed in recent years, and useful and economic processes have been devised which clarify the purified sewage to the statutory level and make it ready for disposal by drainage. However, there are often considerable difficulties in concentrating or dehydrating the often finely dispersed thixotropic sludge which is yielded in the known purification processes. For instance, filtering is very often difficult; filters clog up rapidly, or else the processes soon become uneconomic because of high first costs or because of high power costs, for instance, in order to maintain a negative or positive pressure. A wide variety of centrifuges have been tried out but have not proved satisfactory, since they fail to provide a satisfactory separation between the solids and the water and have high power costs. Nor have screens proved satisfactory, for screens rapidly become clogged, while the screened water still has considerable solid contents. Ion exchange apparatus has also proved unsatisfactory. Although used on a large scale to desalt and soften water, ion exchange apparatus has not proved satisfactory for sewage purification because it is too expensive and yields large quantities of reclaimed product which must be further processed.

The rapid development of industry in recent years means a continuous increase in the wastes which are statutorily prohibited from entering the drainage system. Since clarifying is now being tackled satisfactorily in most cases but the concentration or dehydration of the sludges yielded in clarification is still very difficult, the sewage problem which today confronts authorities and industry has become a sludge problem which is often called "problem No. 1" in the technical circles concerned.

Sewage purification plant economics, whether for purifying communal sewage or industrial sewage, are governed mainly by the kind of dehydration or concenrtation of sludge used, by the power costs for such concentration and dehydration, and by the space required by the corresponding apparatus.

This invention solves this problem. According to this invention, weighting agents are added to the sludge before or during or after the addition of the agglomerants, become associated with the solids, increase the specific weight thereof and cause them to drop, whereafter the resulting solid flakes are given a further addition of agglomerant to become a sediment which has a high concentration of solids and which can be separated from the purified water merely by decanting without needing filtration. The solids contained in the voluminous sludges—which often have water contents of 98%—are, therefore, combined by adsorption of the agglomerants, because of electrostatic interaction therewith, to form a solid sediment from which so much clarified water has been separated that such water can be decanted in a very simple way, for instance, by overspill. The resulting inspissated sludge has a pudding-like consistency, is compact, water-repellant and water-insoluble; it can therefore be easily handled as it is yielded and dumped.

It may often be desirable for the sediment to be given further mechanical dehydration by which is to be understood light rolling or shaking or expressing or centrifuging.

The time at which the weighting agents are added depends upon the nature of the sludge being treated. Similar considerations apply to the nature of the agglomerants, which depends upon the nature, origin and chemical composition of the sludge or deposit to be treated and which can readily be determined individually for each case.

The precipitants of natural origin are extracts from plants, fruits or animal products, such as starch flour, ground carob bean, resins or the equivalent; albuminous substances make particularly suitable natural agglomerants. Synthetic high molecular carboxylic group-containing polymers are employed as synthetic agglomerants. The synthetic agglomerants are commercially available substances including those having the commercial names "Separan NP10" (a high molecular weight synthetic polymer containing both amide and carboxylic groupings), "Sursolan" (an agent on the basis of polyacrylamide), "Sedipur" (high molecular organic substances derived from polyacrylic acid), and others. A distinction is made with these synthetic agents between mainly anionic and mainly cationic agglomerants. Preferably, anionic precipitants are used for the alkaline range and cationic precipitants for the acid range.

When adding preciptants as well as when adding weighting agents an intensive oxidation of the sludge takes place simultaneously by aeration or chlorination since this aids also in reducing the sludge volume.

Advantageously, the agglomerant is used in the form of an aqueous solution, in which event the solution can have a concentration of from 0.5 to 5 g./l. preferably from 1 to 2 g./l. The concentration of the agglomerants can readily be determined individually for each case and depends upon the nature, origin and proportion of solids of the sludges. Conveniently, the agglomerant solution is used in proportion to the quantity and nature of the solid to be precipitated, preferably from 1 to 200 g. of agglomerant being used per metric ton of dry solid substance. Usually, 2 to 5 g. of agglomerant per metric ton of dry solid substance are sufficient.

In the step proposed by the invention of a further addition of agglomerant, the quantities and concentrations of agglomerant are such as will considerably consolidate the sediment. The main way in which the sludge consolidates is that the solids are combined by the action of the agglomerants and therefore settle from the water. The preciptants have the property, more particularly if used in a relatively high concentration, of acting as binders; it depends upon individual cases whether or not the same substance as was used for the first addition is used for the further addition of agglomerant. Mixtures of the various agglomerants can always be used.

According to the invention, as weighting agents there are used mineral substances, such as coal ash, limestone powder, cement or the waste evolved in the processing of coal. The particular weighting agents used in each case depend upon the nature, origin and chemical composition of the sludges. In the case of finely dispersed thixotropic deposits it is preferred to use weighting agents which also act as binders, such as cement or gypsum.

According to the invention, the purifying processes outlined can be used to purify waste waters of industrial or municipal origin, more particularly the washing waters and used pickling acids of metal-processing undertakings.

EXAMPLE

According to the invention, for instance, hydrochloric-acid-containing washing water from a metal pickling plant can be treated by the following steps or stages:

(1) Since cheap neutralising agents form a large volume of small easily destroyed flakes, expensive neutralising agents or flocculating agents are often used; they reduce volume but do not justify their cost. However, in the subsequent steps of the process according to the invention, the volume of the sludge is reduced very considerably, and so it does not matter if at first the flakes which form are distributed over the entire volume of the waste water. The neutralising agent which is cheapest to obtain locally or which is present as a waste product, for instance, hydrate of lime or lime from an acetylene gas production plant, can therefore in known manner be used to produce the neutralisation. This was how, for instance, acid washing water from a pickling plant for refined steel was neutralised, the water analysing as follows:

*Washing water*

| | |
|---|---|
| pH value | 1.70 |
| m-Acidity (mval./l.) | 123 |
| Iron II (Fe, mg./l.) | 281 |
| Iron III (Fe, mg./l.) | 820 |
| Chromium (Cr, mg./l.) | 100 |
| Nickel (Ni, mg./l.) | 50 |
| Chloride (Cl, mg./l.) | 4600 |
| Fluoride (F, mg./l.) | 253 |
| Nitrate ($NO_3$, mg./l.) | 12 |
| Phosphate ($PO_4$, mg./l.) | 0.8 |

(2) The neutralisation sludge evolved in the neutralisation set forth in (1) is very voluminous and is distributed throughout the entire quantity of waste water. The flakes are easily destroyed and are soluble in water. Sludges of this kind take a very long time to settle, for instance, requiring to be left standing for as much as several hours. Even after settling, the volume of the sludge is still about from 50 to 70% of the original volume.

In the example just mentioned, to accelerate sedimentation a high-molecular-weight synthetic flocculating agent in a highly diluted form is added to the neutralisation sludge immediately after neutralisation. This anionic precipitant was adsorbed rapidly, a number of small easily destroyed flakes combining, because of electrostatic effects, to form very large strong flakes which are not destroyed during subsequent agitation.

(3) The combination of a large number of small flakes to form large flakes led to the volume of the sludge in the example just mentioned being reduced to about 30% of the original volume in a matter of seconds. The purified water then yielded was decanted. The flakes in the remaining water in the sludge left behind were in suspension—i.e., their specific weight was too low for them to settle to form a sediment. To further reduce volume, the flakes were, according to the invention, given an addition of substances of mineral origin, such as cement or ash or other cheaply available local minerals. These mineral substances become associated preferably with the flakes, so that the volume of the sludge is further reduced. In the present example, the sludge volume was reduced by an addition of cement to about 14% of the original volume, so that more water could be decanted. The association of the minerals with the flakes leads to the same cohering to form a number of large flakes and to a corresponding consolidation. It should be noted, however, that the addition of mineral substances, preferably cement, may in the most instances take place before the flocculating agent (agglomerant) is added. The addition of cement can then be acknowledged as the second step of a two-step neutralisation, thus being able to finely adjust the neutralisation grade since the neutralisation curve of lime is very steep within the range from pH=6 up to pH=11 while the respective curve of cement is rather flat.

In case alkaline sewage is to be purified the sewage is first neutralised in similar manner (for example by adding ferrous sulphate or iron perchloride) but the neutralising agent is added in excess of exact neutralisation, so that a slightly acid pH-value results, and cement or the like can be added as in case of acid sewage which was at least almost completely neutralised by hydrate of lime or the like. It has been found that when again reaching alkaline pH-values in consequence of the addition of cement no dilution of the already precipitated alkaline foreign substance occurs.

In case of neutral sewage weighting agents of neutral character, as for example gypsum, are used.

(4) In the present example, the flocculating agent already described was added again, but in a higher concentration, to the remainder of the sludge. The flocculating agent was adsorbed rapidly by the flakes and the same cohered to form a solid sediment. When the sediment was moved slightly, for instance, by rolling, it yielded the water which it still contained to become substantially a compact water-repellant and water-insoluble composition.

Analyses of the sludge yielded by the consolidation process hereinbefore described and of the decanted purified water are given hereinafter and show that the purified water is suitable for drainage disposal in the light of present statutory requirements and that the sludge can readily be dumped.

*Decanted water*

| | |
|---|---|
| pH value | 8.20 |
| Total iron (mg./l.) | 0.17 |
| Chromium (Cr, mg./l.) | 0 |
| Nickel (Ni, mg./l.) | 0 |
| Calcium chloride ($CaCl_2$, mg./l.) | 3515 |
| Chloride (Cl, mg./l.) | 3300 |
| Phosphate ($PO_4$, mg./l.) | 0 |
| Sulphate ($SO_4$, mg./l.) | 21 |
| Calcium (Ca, mg./l.) | 1269 |
| Solids (mg./l.) | 75 |

*Sludge, moist*

| | |
|---|---|
| pH value | 8.20 |
| Total iron (percent dry substance) | 6.0 |
| Chromium (percent dry substance) | 0.07 |
| Nickel (percent dry substance) | 0.63 |
| Fluoride (percent dry substance) | 0.28 |
| Water (percent) | 85.3 |
| Solids content of the water as such (percent) | 7.72 |

The consolidating process hereinbefore described is, of course, of use with waste waters of widely differing origins. For instance, the process has been used to treat blast-furnace sludge from blast-furnace gas cleaning, municipal sapropel, municipal fresh sludge and the waste waters from a tannery. The only difference between the processings required for the various waste waters is that, for instance, where waste waters of organic origin are being processed, neutralisation is replaced by chemical or biological detoxication of the waste water. The sludges which are yielded are processed exactly as in the example just given, and the concentrated or dehydrated sludges, notwithstanding their different origins, always have the same pudding-like consistency.

The process according to the invention provides special advantages which greatly cheapen sewage purification and sludge concentration plant. A very important factor is that expensive filtration plant becomes unnecessary. Also, there is a considerable reduction in plant costs per cubic metre of waste water, since the dwell time in the settlement basin is reduced and so the same can be much smaller than previously. Another great advantage is that drying beds are not required, thus further reducing the amount of space required by the processing plant per cubic metre of waste water. Since the sludge is thoroughly concentrated, transport costs for removal of the sludge are reduced since only a very small quantity of water needs to be transported.

The process according to the invention in very economical also because it can be performed continuously and power costs for its performance are very low. Another important factor is that the process according to the invention requires neither a negative nor a positive pressure. Since the process is of use with waste waters of widely different origin, there is a considerable reduction in construction and planning costs.

I claim:

1. A process of consolidating a voluminous, low-solids-content sludge which is distributed throughout a quantity of waste water comprising adding a first quantity of agglomerants to said waste water, adding weighting agents to said waste water to cause the agglomerants and weighting agents to become associated with the solids in said sludge and to increase the specific weight of said solids and cause them to precipitate and settle as solid flakes, decanting a first quantity of purified water from the flakes, adding an additional quantity of agglomerants to the solid flakes to convert said flakes into a sediment of thick consistency having a high concentration of solids, and separating an additional quantity of purified water from said sediment by decanting.

2. A process according to claim 1, in which said weighting agents are added to said sludge after the addition of said agglomerants.

3. A process according to claim 1, in which said weighting agents are added to said sludge before the addition of said agglomerants.

4. A process according to claim 1, in which said weighting agents are added to said sludge during the addition of said agglomerants.

5. A process according to claim 1, in which said purified water is decanted from said sediment without filtration.

6. A process according to claim 1, in which commercially available agglomerants of the synthetic high molecular carboxylic group containing polymers are used.

7. A process according to claim 1, in which albuminous substances are used as agglomerants.

8. A process according to claim 1, in which the agglomerants are used in the form of an aqueous solution.

9. A process according to claim 1, in which the agglomerants are used in the form of an aqueous solution having a concentration of from .5 to 5 grams per liter.

10. A process according to claim 1, in which the agglomerants are used in the form of an aqueous solution having a concentration of from 1 to 2 grams per liter.

11. A process according to claim 1, in which said agglomerants are supplied to said sludge in form of a solution for purification in quantities which are determined in dependence upon the quantity and nature of the solids to be precipitated.

12. A process according to claim 1, in which said agglomerants are supplied to said sludge in form of a solution for purification in quantities from 1 to 200 grams of agglomerant for each metric ton of dry solids.

13. A process according to claim 1, in which the added additional agglomerants are supplied in such quantities that they act as consolidating agents for the sediment.

14. A process according to claim 1, in which weighting agents comprising mineral substances of the group including coal, ash, limestone powder, cement, and waste produced during the processing of coal, are used.

15. A process according to claim 1, in which for consolidating of finely dispersed thixotropic deposits the weighting agents used comprise cement and gypsum.

16. The process according to claim 1, used for purifying industrial and municipal sewage, flushing waters and exhausted pickling acids in metal processing plants.

References Cited by the Examiner

UNITED STATES PATENTS

| 1,619,036 | 3/1927 | Ravnestad | 210—51 |
| 1,672,584 | 6/1928 | Travers | 210—52 |
| 2,941,942 | 6/1930 | Dahlstrom et al. | 210—53 |
| 3,142,638 | 7/1964 | Blaisdell et al. | 210—53 |

FOREIGN PATENTS

| 607,440 | 10/1960 | Canada. |
| 860 | 1877 | Great Britain. |

OTHER REFERENCES

Dow II—Separan 2610, reprint from the "Dow Diamond" for March 1955, 7 pp., Dow Chemical Co., Midland, Michigan.

"Separan 2610 in Waste and Sewage Treatment," a publication of the Dow Chemical Co., Midland, Michigan, October 1956, 25 pages.

MORRIS O. WOLK, *Primary Examiner.*